US011808844B2

(12) United States Patent
Fretter et al.

(10) Patent No.: US 11,808,844 B2
(45) Date of Patent: Nov. 7, 2023

(54) APPARATUS FOR ACQUIRING INFORMATION ON OCCUPANCY STATES OF PARKING SPACES AND METHOD RELATED THERETO

(71) Applicant: Parkling GmbH, Berlin (DE)

(72) Inventors: Christoph Fretter, Berlin (DE); Mark Hashimoto, Berlin (DE); Detlev Huelsebusch, Berlin (DE); Clement Quinson, Berlin (DE)

(73) Assignee: Parkling GmbH, Berlin (DE)

( * ) Notice: Subject to any disclaimer, the term of this patent is extended or adjusted under 35 U.S.C. 154(b) by 312 days.

(21) Appl. No.: 17/140,895

(22) Filed: Jan. 4, 2021

(65) Prior Publication Data

US 2021/0223390 A1 Jul. 22, 2021

(30) Foreign Application Priority Data

Jan. 16, 2020 (EP) ..................................... 20152126

(51) Int. Cl.
*G01S 13/931* (2020.01)
*H04W 4/40* (2018.01)
(Continued)

(52) U.S. Cl.
CPC ............ *G01S 13/931* (2013.01); *G08G 1/065* (2013.01); *G08G 1/14* (2013.01); *H04W 4/40* (2018.02);
(Continued)

(58) Field of Classification Search
CPC .......... G01S 13/931; G01S 2013/9322; G08G 1/065; G08G 1/14; G08G 1/0112;
(Continued)

(56) References Cited

U.S. PATENT DOCUMENTS 10,311,731 B1 * 6/2019 Li ........................... G08G 1/012
2014/0085112 A1 3/2014 Gruteser et al.
(Continued)

FOREIGN PATENT DOCUMENTS

DE 10 2014 009627 A1 11/2014
DE 10 2014 217900 A1 3/2016
(Continued)

OTHER PUBLICATIONS

RLX Components, Lidar-lite v3 (sparkfun SEN-14032) 0-40m laser emitter, accuracy +/− 2.5cm, 2016, rlx.com (Year: 2016).*
(Continued)

*Primary Examiner* — Shardul D Patel
*Assistant Examiner* — Chase L Cooley
(74) *Attorney, Agent, or Firm* — HARNESS, DICKEY & PIERCE, P.L.C.

(57) ABSTRACT

The invention relates to an apparatus for acquiring information on the occupancy state of parking spaces with a fixing device for fixing on a vehicle, with a sensor which has a detection area, wherein the sensor is designed for determining data on the distance between the sensor and an object. The apparatus according to the invention is characterized in that in addition a device for position determination is provided and a control and evaluation unit is designed to link the data of the sensor with the data of the device for position determination, wherein the sensor is configured to detect at least a distance of 40 meters.

18 Claims, 2 Drawing Sheets

(51) Int. Cl.
*G08G 1/065* (2006.01)
*G08G 1/14* (2006.01)

(52) U.S. Cl.
CPC .. *B60W 2420/52* (2013.01); *G01S 2013/9322* (2020.01)

(58) Field of Classification Search
CPC ...... G08G 1/04; H04W 4/40; B60W 2420/52; G06V 20/586
See application file for complete search history.

(56) References Cited

U.S. PATENT DOCUMENTS

| | | |
|---|---|---|
| 2019/0012918 A1 | 1/2019 | Abeling et al. |
| 2019/0359147 A1 | 11/2019 | Zajac |

FOREIGN PATENT DOCUMENTS

| | | |
|---|---|---|
| DE | 10 2015 225415 A1 | 6/2017 |
| DE | 10 2016 212505 A1 | 1/2018 |
| DE | 10 2017 100983 A1 | 7/2018 |
| DE | 10 2018 214510 A1 | 3/2019 |
| DE | 10 2017 130488 A1 | 6/2019 |
| DE | 10 2018 107510 B3 | 7/2019 |
| DE | 10 2018 113496 A1 | 12/2019 |
| WO | WO-2016/200883 A1 | 12/2016 |

OTHER PUBLICATIONS

StMicroelectrics, GPS/Galileo/Glonass/Beidou/QZSS Receiver, 2017, ST.com, website (Year: 2017).*
Dataspeed Inc., ADAS Kit Demonstration, 2017, Youtube, https://www.youtube.com/watch?v=lwAoO6hXT4Q (Year: 2017).*
SICK Sensor Intelligence, "LMS1000 Lightning-Fast Measurement—in Record Time!", XP055708258, URL:https://cdn.sick.com/media/docs/1/21/121/Product_Information_LMS1000_2D_LiDAR_sensors_en_IM0080121.PDF, Sep. 13, 2019, (Sep. 13, 2019), pp. 1-20.
European Search Report issued in EP 20152126.7, dated Jul. 15, 2020 (in German).

* cited by examiner

APPARATUS FOR ACQUIRING INFORMATION ON OCCUPANCY STATES OF PARKING SPACES AND METHOD RELATED THERETO

FIELD

The invention relates systems and methods for acquiring information on an occupancy state of parking spaces. This apparatus has a fixing device for fixing on a vehicle and a sensor which has a detection area. When the apparatus is in the fixed state on the vehicle the detection area is aligned laterally to the direction of travel of the vehicle. The sensor is designed to determine data on the distance between the sensor and a remote object.

Furthermore, the invention relates to a parking space management system and a method for acquiring information on an occupancy state of parking spaces by making use of the apparatus according to the invention.

BACKGROUND

As a result of the population growth in urban regions traffic is increasing, in particular also the individual traffic in passenger cars. Especially in the inner-city area this massive increase in traffic density leads to problems which cause a shortage of space that can no longer be solved by simple means. Further problems are not only the concomitant noise pollution through traffic, but also the exposure to contaminants which, in the meantime, is being increasingly regarded with concern.

Studies have shown that approximately 30% of inner-city traffic is not classical transportation traffic but can be ascribed to vehicles in search of a parking space. Projections for Germany reveal that 1.9 billion hours are spent on searching out parking spaces. For this, 3.2 billion liters of fuel are consumed. All in all, an economic loss in the amount of 40.4 billion Euro is assumed.

Therefore, the call for a parking space management that reduces this traffic in search of a parking space makes its presence felt to an increasing extent.

In the case of such systems a basic distinction is made between two states of data determination. On the one hand, static data would have to be obtained, which indicate where parking spaces are located, at which times parking in these parking spaces is permitted, but which also provide information as to how the parking spaces are to be parked in, e.g., as lengthways or cross-wise parking. This also includes information about no-parking zones as well as possible parking fees. Such data are referred to as static data and constitute the fundamental prerequisite for a parking space management system.

However, these data are insufficient to offer an active, efficient parking space management system. For this, so-called dynamic data are additionally required. These represent information, on the basis of which a current parking space occupancy situation can be determined.

The determining of such static data is described in DE 10 2018 214 510 A1 or DE 10 2016 212 505 A1 for example.

The determining of dynamic data or their prediction is known from DE 10 2018 107 510 B1 or WO 2016/200883 A1 for example.

However, particularly when determining dynamic parking data the known methods lead to the problems that these are either imprecise or require a high level of investment, e.g., when provision is made for firmly installed sensors for parking spaces.

SUMMARY

The invention is therefore based on the object to provide an apparatus and a method for acquiring information on an occupancy state of parking spaces that is efficient and easily scalable.

In accordance with the invention this object is achieved by an apparatus having the features of the appended claims.

Advantageous embodiments of the invention are stated in the subclaims, the description as well as the FIGURE and its explanation.

The apparatus according to the invention has a device for position determination. Furthermore, a control and evaluation unit is provided which is designed to link the data of the sensor with the data of the device for position determination to linked data. Moreover, the sensor is designed such that it is able to detect at least a distance of 40 meters.

The invention is based on the idea that when static parking space data are present, it is sufficient to determine the distances between a sensor fixed on a vehicle and the closest possible object to make statements on the current occupancy state of a parking space. For this, the sensor, which is fixed with the fixing device on the vehicle and is aligned laterally to the direction of travel of the vehicle, is used to determine in each case the distance from the sensor to the next object.

If the vehicle with the sensor travels along a street, along the side of which cars are parked, the distance determined, i.e., the distance between the sensor and an object is in most cases expected to lie in the range of between 1 and 3 meters. This also depends on the precise positioning of the sensor on the vehicle.

With a distance thus determined, a parking space management system connected downstream can assume that on the position belonging to the data, a vehicle or an object is parked, provided that this is a potential parking space according to the existing static data.

If, on the other hand, it is determined that the next object is e.g., the wall of a house at a distance of 8 to 10 meters, the conclusion can be drawn therefrom that given the general existence of a parking facility according to the static data, this parking facility is not occupied.

To enable evaluation of the dynamic data thus determined, i.e., of the current distance of the sensor to the next object, provision is made according to the invention for a device for position determination. The data of the device for position determination are linked with the sensor data so that linked data are available. In a parking space management system connected downstream, these linked data are then evaluated together with existing static parking data to make current statements on the occupancy state of parking spaces.

From this, it is possible to determine on the one hand statistic predictions taking account of the time, the day, as well as up-to-date information on the occupancy state.

It is preferred if the sensor has at least a scanning frequency of 140 Hz. This requirement is based on the assumption that in the case of a maximum speed of 50 km/h in built-up areas, a minimum required resolution of approximately 10 cm has to be reached. Such a spatial resolution of 10 cm has proved to be necessary to obtain reliable data on the occupancy state of parking spaces. Such a resolution is necessary because objects parked in parking spaces, more particularly cars, can be located at different positions. In addition, the fact has to be taken into account that e.g., not every car has the same length or in addition that motorcycles can be parked diagonally. Within the meaning of the invention a resolution of approximately 10 cm means that a distance measurement is carried out at least every 10 cm.

Processing of the data obtained by means of the sensor can be facilitated if in the fixed state on the vehicle the detection area is aligned between 85° and 95° to the direction of travel, preferably approximately 90°. Such an alignment offers the advantage that for the determined data, no additional deviation of the position of the sensor has to be taken into account, so that the distance can be used without any corrections. In other words, the distance determined by means of the sensor corresponds to the distance between the sensor and the object located perpendicularly to the direction of travel. If the sensor were aligned further towards the front or the rear this would have to be taken into account in an evaluation.

Basically, different types of sensors can be employed. For example, ultrasonic sensors, cameras, parallax-based lasers or the like can be used. However, the use of a LIDAR sensor, in particular a 1D LIDAR sensor, proves to be particularly easy. Use can also be made of 2D or 3D LIDAR sensors. The advantage of using LIDAR sensors as compared to the aforementioned other types of sensors is their relatively high robustness against environmental influences and their high precision. Especially when making use of a 1D LIDAR sensor, the necessary investment costs can be kept at a low level. This is advantageous since the apparatus according to the invention is preferably intended to be employed and mounted not only on one vehicle but on an entire vehicle fleet in order to determine a plurality of data. For example, it is expedient to install or fix the apparatus according to the invention on taxis as these are normally on the move especially in inner-city areas on a regular basis. Another advantage of using a LIDAR sensor is that no images are recorded that may contain personally identifiable information. Therefore, necessary time-consuming steps for data protection can be dispensed with.

To facilitate mounting or installation of the apparatus according to the invention it is preferred that the apparatus solely draws electricity from the vehicle. In other words, the apparatus is on the whole of self-sustaining design. This offers the possibility to attach it to different vehicles without the need to be integrated into the vehicle system itself.

It is of advantage if a data modem for the wireless transmission of the linked data is provided. By means of this data modem the linked data can be transmitted to a central location, for instance a central server of a parking space management system, where linked data can be subsequently processed in a further step.

Transmission by means of the control and evaluation unit can take place in a continuous or quasi-continuous manner. Within the meaning of the invention, quasi-continuous can be regarded e.g., as a transmission of the determined data every minute, every 15 minutes or every 10 minutes. Likewise, what is to be understood by continuous is not a nonstop data stream but the fact that a transmission takes place at reasonable intervals, for example at an interval of 30 or 10 seconds.

Transmission of the data has the advantage that the dynamic data thus determined on the occupancy of parking spaces are available to a parking space management system, can be evaluated by this and processed further.

Basically, the device for position determination can be of any chosen design. In order to increase the accuracy of the data particularly in urban areas, in which position determination is not often easy, provision can be made for an inertial measuring unit. By means of this the determined data of position determination can be optimized.

An alternative or additional possibility to optimize the data of position determination is to provide a separate external aerial that can be connected to the apparatus according to the invention. For example, this can be an aerial that is fixed on the roof of the vehicle. In conjunction with this, the device for position determination, in particular for global position determination, can be designed for satellite-based position determination. For instance, it can be designed according to the GPS standard, Galileo, Glonass and/or Beidou standard. It is also possible that it uses several of these standards simultaneously in order to enhance the quality of the determined position. Basically, other position determination systems can also be used. If, in an area, local position determination systems are also present, it is of course also possible to use these additionally or alternatively.

Due to the previously described high frequency and the related spatial resolution of the data determined by way of the sensor in the range of 10 cm, a resolution as precise as possible of the local position is desirable. This can also be improved on e.g., in that in the apparatus a marker database is provided, and in that the control and evaluation unit is designed to optimize the linked data, in particular their localization, by means of the marker database. The marker database can for example constitute parts of a database on static objects in a city or the like. For this, lamp posts, trees or corners of houses are suitable for example. These data can only be used to determine an offset to the data of position determination.

An alternative or even optional possibility to increase or improve the resolution of the local position can also consist in the use of data for differential global positioning systems, such as DGPS, that are commercially available. Likewise, Real Time Kinematic (RTK) can also be used alternatively or additionally to increase the positional accuracy.

Furthermore, the invention relates to a parking space management system with at least one vehicle having an apparatus according to the invention. As already set out above, this apparatus is preferably fixed in a removable manner on the vehicle. If this vehicle is moved in a desired area, information on the occupancy states of the parking spaces can be transmitted by means of the apparatus according to the invention to the parking space management system. To increase the data flow several vehicles can, of course, also be provided.

Finally, the invention also relates to a method for acquiring information on an occupancy state of parking spaces, in particular with an apparatus according to the appended claims, wherein the apparatus according to the invention is fixed by means of the fixing device on a vehicle and the vehicle is moved in road traffic. Meanwhile, by means of the sensor data, the distance between the sensor and an object are determined, and by means of the device for position determination, data are determined that are linked to linked data. These linked data are forwarded to an external evaluation unit.

By means of this method it is possible to determine dynamic information on current occupancy states of parking spaces which can then be evaluated by a parking space management system. In doing so, the evaluation can take place promptly on direct transmission of the determined linked data or also at a later stage if the linked data are stored in the apparatus according to the invention.

BRIEF DESCRIPTION OF DRAWING

The invention is described in greater detail hereinafter by way of a schematic embodiment with reference to the FIGURE, wherein shows.

DETAILED DESCRIPTION

Figure 1:
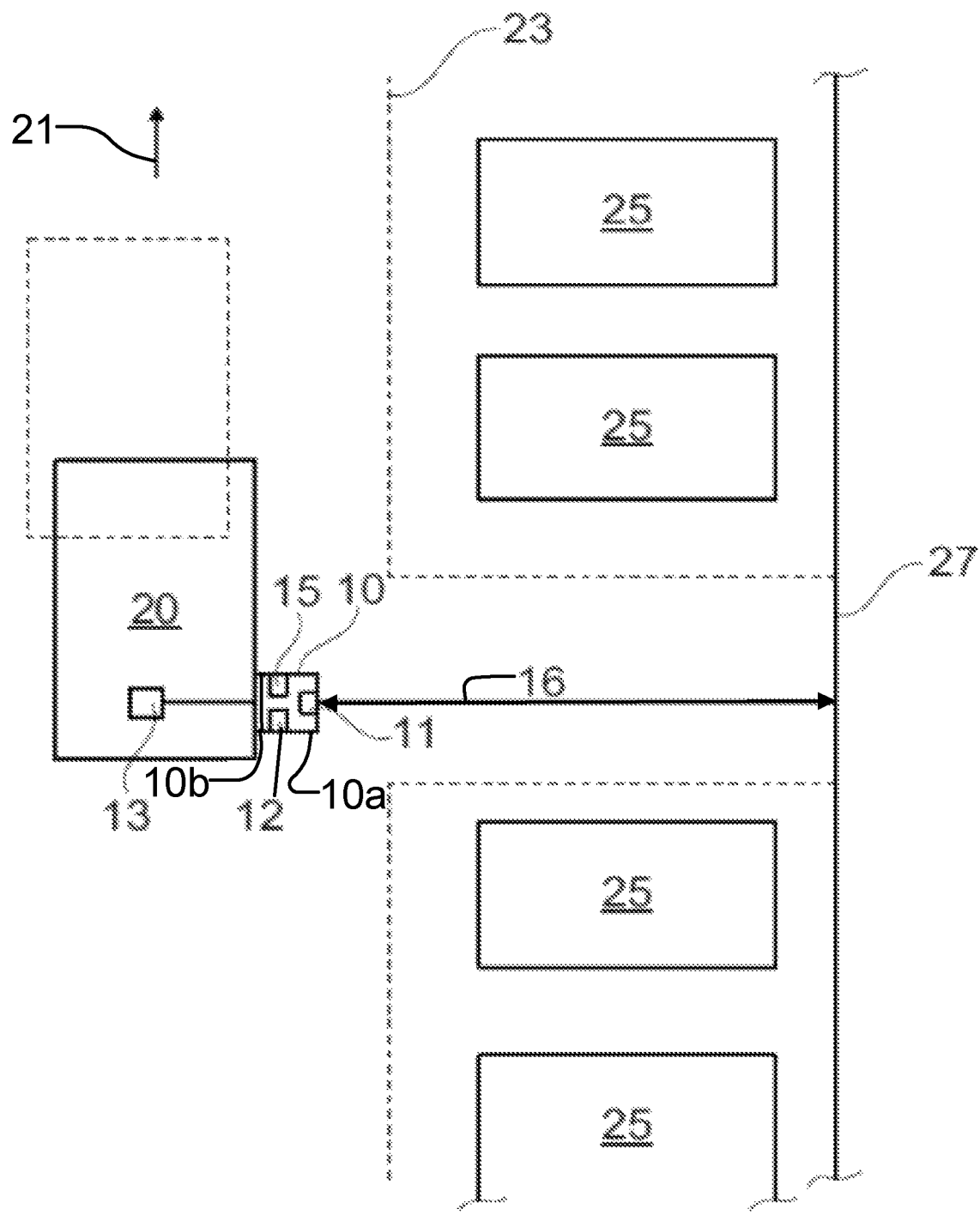
FIG. 1 a schematic view of the apparatus according to the invention when in use.

FIG. 1 shows a highly simplified illustration of the apparatus 10 according to the invention when being used.

Figure 2:
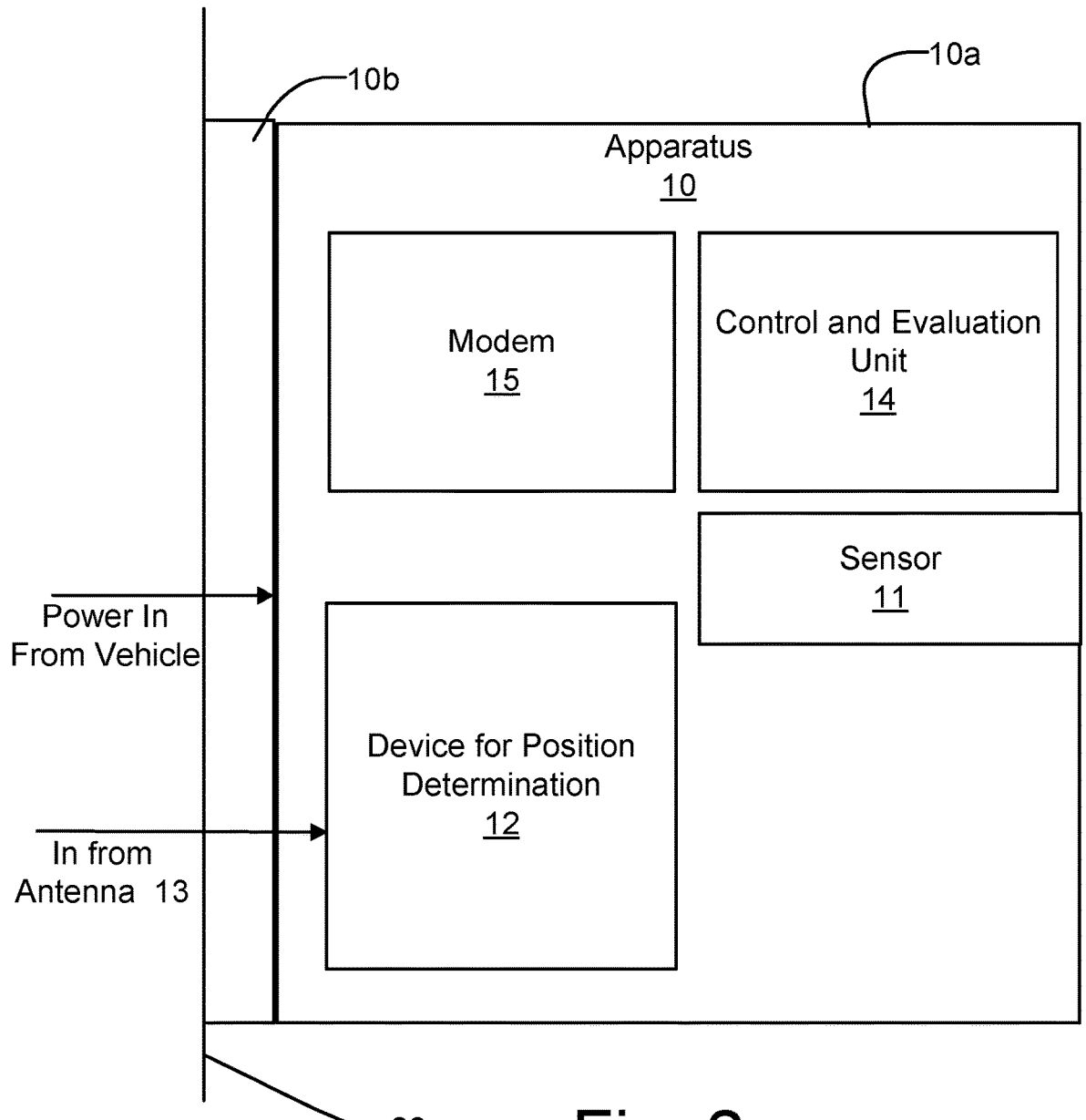
FIG. 2 is a high level schematic diagram showing the apparatus in greater detail.

For this, the apparatus 10 according to the invention is fixed on a vehicle 20, for example a taxi. The apparatus 10 has a housing 10a which may be affixed to the exterior of the vehicle 20 using a fixing device 10b, and which may house a sensor 11, as well as a device 12 for position determination. This can be a GPS sensor for example. This GPS sensor 12 is connected to an external aerial 13 which is fixed on the roof of the vehicle 20. In this way, the quality of the GPS signal can be enhanced. FIG. 2 shows the apparatus 10 in greater detail, wherein the apparatus can also be seen to include a control and evaluation unit 14 as well as a modem 15.

The apparatus 10 according to the invention can either be fixed laterally on the vehicle 20, e.g., above the rear tire or also on the rear bumper. It is, of course, also possible to fix the apparatus 10 according to the invention on the front bumper or on the door.

According to the invention provision is furthermore made for the apparatus 10 to be provided at the height of approximately 50 cm, in particular in the range of between 40 and 70 cm up to 110 cm in relation to the street level. Such a height produces the best results, as described in the following. When scanning at this height, the bumper or the most protruding area of a car is most likely to be considered.

The apparatus 10 is attached in such a way that the sensor 11 is aligned laterally to the direction of travel 21. The sensor 11 can preferably be a 1D LIDAR sensor. An apparatus 10 constructed in such a way is relatively cost-efficient, for example it can already be constructed for approximately 500 Euro. It can therefore be considered suitable for fleets so that a large number of apparatuses 10 according to the invention can be arranged on different vehicles 20.

The sensor 11 is aligned laterally to the direction of travel 21 and measures the distance 16 from the sensor 11 to the next object. Furthermore, in FIG. 1 a parking area 23 is illustrated, on which several objects 25 are parked. On the side facing away from the street the parking area 23 is closed off by a house wall 27. By means of the sensor 11 the apparatus 10 can now determine the distance between the sensor 11 and the next object 25, 27. In the position shown here the distance to the house wall 27 is determined.

If the vehicle 20 were located in position 22, which is indicated by dotted lines, a different distance to one of the objects 25 would in turn be established.

On the basis of the determined distance a defined statement on an occupancy state of parking spaces cannot at first be made as no information is as yet available as to whether, e.g., in the place shown first, a driveway is located in which parking is prohibited, or even whether a parking space is available. To enable this conclusion, static parking space data are necessary that contain precisely this static information.

Linking of these static parking space data with the determined dynamic data can for example take place in that the apparatus 10 has the modem 15. The modem 15 is able to transmit the dynamic data thus determined to a central server that has access to the static parking space data. Transmission may be by means of the control and evaluation unit can 14, which can take place in a continuous or quasi-continuous manner. Hence, by means of a parking space management system, statements on the current occupancy can be made but also forecasts for future occupancies or statistic predictions.

By way of the apparatus according to the invention and the method according to the invention it is thus possible to efficiently determine information on occupancy states of parking spaces.

The invention claimed is:

1. An apparatus for acquiring information on an occupancy state of parking spaces, the apparatus comprising:
    a housing adapted to be secured to a surface of a vehicle and being removable from the vehicle when the apparatus is not needed for use with the vehicle;
    a sensor housed within the housing which has a detection area;
    wherein in a fixed state on a vehicle, the detection area is aligned laterally to a direction of travel of the vehicle;
    wherein the sensor is designed for determining data on a distance between the sensor and an object,
    wherein the housing of the apparatus is disposed fixedly on the vehicle at a height in a range of between 40 cm and 110 cm in relation to a street level on which the vehicle is supported;
    a device for position determination which generates position data relating to a position of the vehicle;
    a control and evaluation unit which is designed to link the data generated by the sensor with data of the device for position determination, to create linked data;
    the sensor comprises a LIDAR sensor; and
    in the fixed state on the vehicle, the detection area is aligned between 85° and 95° relative to the direction of travel of the vehicle, and within a range of 40 cm and 110 cm above the street.

2. The apparatus of claim 1, wherein the detection area is aligned at 90° to the direction of travel of the vehicle.

3. The apparatus of claim 1, wherein the sensor has a scanning frequency of at least 140 Hz.

4. The apparatus of claim 1, wherein the apparatus is powered by electric power drawn from the vehicle.

5. The apparatus of claim 4, wherein the apparatus is powered exclusively by the electric power drawn from the vehicle.

6. The apparatus of claim 1, further comprising a data modem for wireless transmission of the linked data.

7. The apparatus claim 6, wherein the control and evaluation unit is designed for continuous or quasi-continuous transmission of the linked data by the data modem to an external server.

8. The apparatus of claim 1, wherein the device for position determination includes an inertial measuring unit for optimization of the data.

9. The apparatus of claim 1, further comprising a separate external aerial which is connectable to the device for global position determination.

10. The apparatus according to claim 1, wherein the device for position determination includes at least one of:
    a GPS based position determination system;
    a Galileo based position determination system;
    a Glonass based position determination system; or
    a Beidou based position determination system.

11. The apparatus of claim 10, wherein the device for position determination uses at least two of the GPS, Galileo, Glonass and Beidou based position determination systems in parallel.

12. The apparatus of claim 1, further comprising:
a marker database; and
wherein the control and evaluation unit is designed to optimize the linked data by means of the marker database.

13. The apparatus of claim 1, further including a parking space management system configured to receive the linked data.

14. The apparatus of claim 1, further comprising a vehicle on which the apparatus is mounted.

15. The apparatus of claim 1, wherein the sensor is able to detect objects out to a distance of at least 40 meters.

16. A method for acquiring information on an occupancy state of parking spaces with the apparatus according to claim 1.

17. A system for acquiring information on an occupancy state of a plurality of parking spaces, the system comprising:
an apparatus adapted to be mounted on a vehicle, the apparatus including:
a housing adapted to be secured to an exterior surface of the vehicle and to be removed from the exterior surface when the apparatus is not needed for use on the vehicle;
a LIDAR sensor supported from the housing which has a predetermined detection area;
wherein in a fixed state on a vehicle, the detection area is aligned laterally to a direction of travel of the vehicle, and between 85° and 95° relative to the direction of travel of the vehicle, and further configured to be within a range of 40 cm and 110 cm above the street;
the LIDAR sensor configured to determine data on a distance between the sensor and an object,
wherein the housing of the apparatus is fixedly mounted on the vehicle at a height in a range of between 40 cm and 110 cm in relation to a street level on which the vehicle is supported;
a device for position determination, supported from the housing, which generates position data;
a control and evaluation unit, supported from the housing, which is designed to link the data generated by the sensor with data of the device for position determination, to create linked data;
a modem supported from the housing for transmitting the linked data; and
a parking space management system remote from the apparatus and the vehicle, and in wireless communication with the modem, for using the linked data to determine at least one of:
a current occupancy of a given space; or
forecasts for future occupancies or parking spaces; or
statistic predictions relating to occupancies or parking spaces.

18. A method for an occupancy state of a plurality of parking spaces, the method comprising:
providing an apparatus having a housing, the housing being adapted to be fixed on an exterior surface of the vehicle, and removable from the vehicle when the apparatus is not needed for use on the vehicle, the apparatus further able to remain fixed to the vehicle as the vehicle is moving in road traffic on a street,
using a LIDAR sensor carried on the apparatus and supported from the housing to generate sensor data on a distance between the sensor and an object remote from the vehicle, wherein the sensor has a field of view orientated perpendicular to a direction of travel of the vehicle and spanning a range of between 85 and 95 degrees relative to a direction of travel of the vehicle, and within a range of 40 cm and 110 cm above the street;
using a device for determining position, which is housed in the housing, to determine a position of the vehicle and to generate position data in accordance therewith;
using a control and evaluation unit housed in the housing to link the sensor data and the position data to create linked data; and
using a modem housed in the housing to wirelessly forward the linked data to a remote system for evaluation to help determine an availability of a parking space for the vehicle.

* * * * *